(12) United States Patent
Greubel et al.

(10) Patent No.: US 6,740,993 B2
(45) Date of Patent: May 25, 2004

(54) AIR-COOLED ELECTRIC ROTARY MACHINE

(75) Inventors: Klaus Greubel, Bad Neustadt (DE); Heinrich Hellmann, Bawinkel (DE); Uwe Schueller, Ilmenau (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/099,540

(22) Filed: Mar. 15, 2002

(65) Prior Publication Data

US 2002/0130566 A1 Sep. 19, 2002

(30) Foreign Application Priority Data

Mar. 15, 2001 (DE) .......................................... 101 12 532

(51) Int. Cl.[7] .................................................. H02K 9/00
(52) U.S. Cl. ............................................. 310/59; 58/62
(58) Field of Search ............................... 310/59, 58, 89, 310/62, 63

(56) References Cited

FOREIGN PATENT DOCUMENTS

| DE | 672 623 C | 3/1939 |
|----|-----------|--------|
| DE | 894 129 C | 10/1953 |
| EP | 0 924 839 A | 6/1999 |
| FR | 1 000 631 A | 2/1952 |

*Primary Examiner*—Burton Mullins
(74) *Attorney, Agent, or Firm*—Henry M. Feiereisen

(57) ABSTRACT

An air-cooled electric rotary machine includes a stator with a stator core formed of laminations and having axial ends, which terminate in winding end portions, and a rotor, which is encircled by the stator with an air gap therebetween. Plural air channels, separated from one another, are formed in or at the stator core for allowing an air stream in complementary flow directions, wherein the air stream is generated by a single fan and deflected at the winding end portions in a looped air stream conduction.

16 Claims, 4 Drawing Sheets

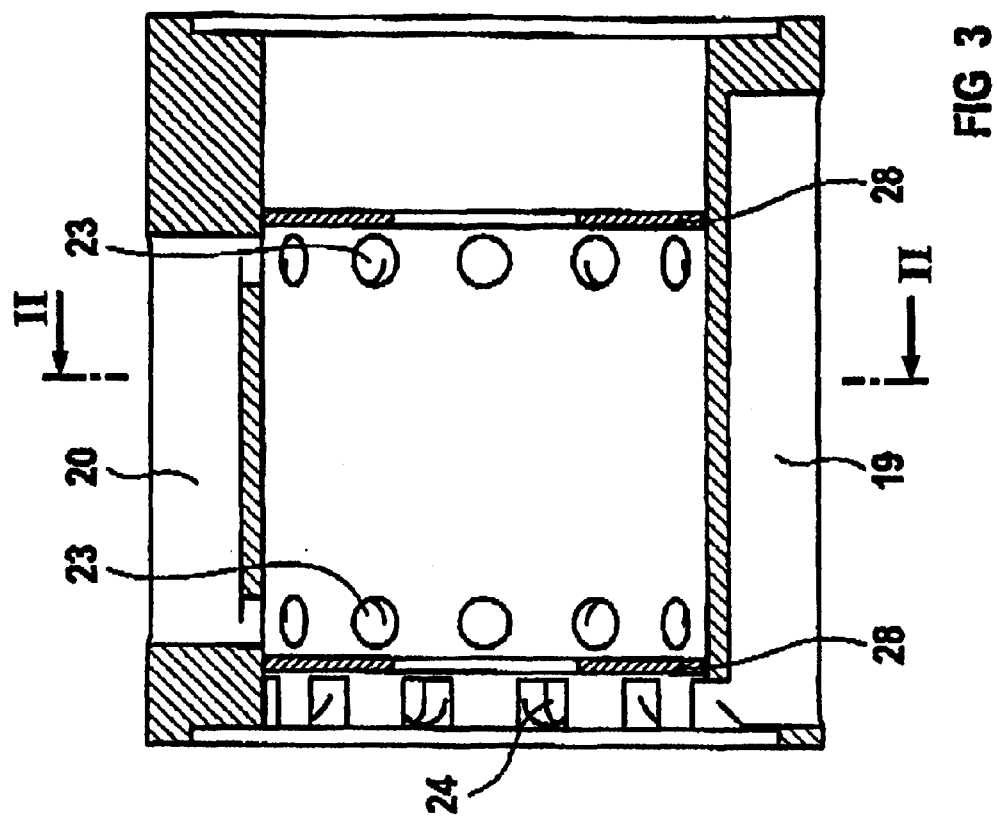
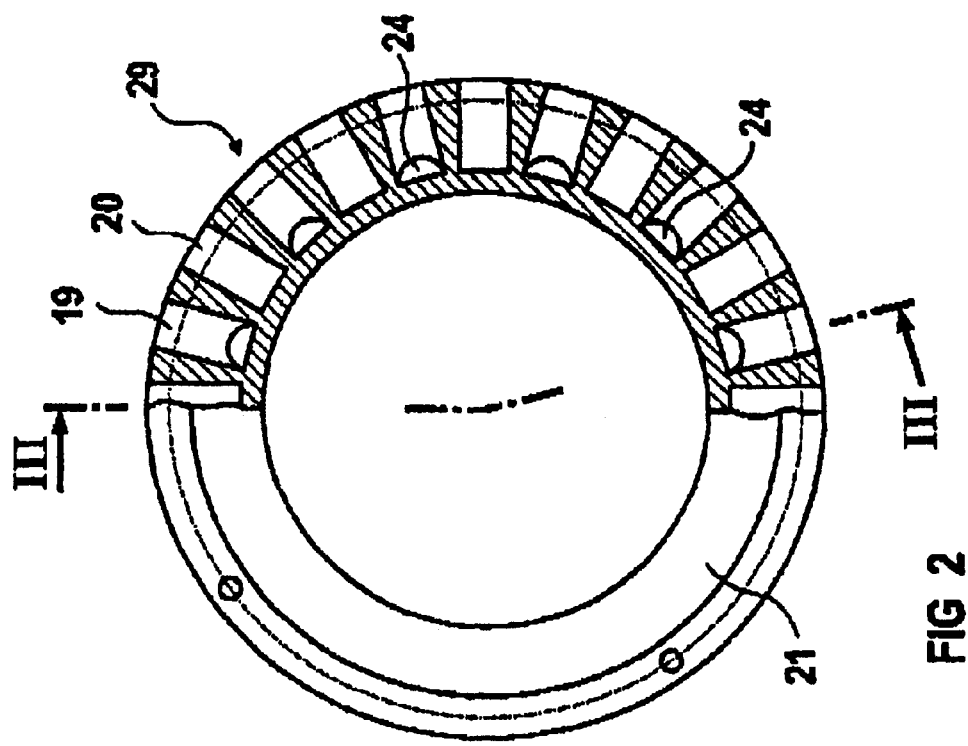

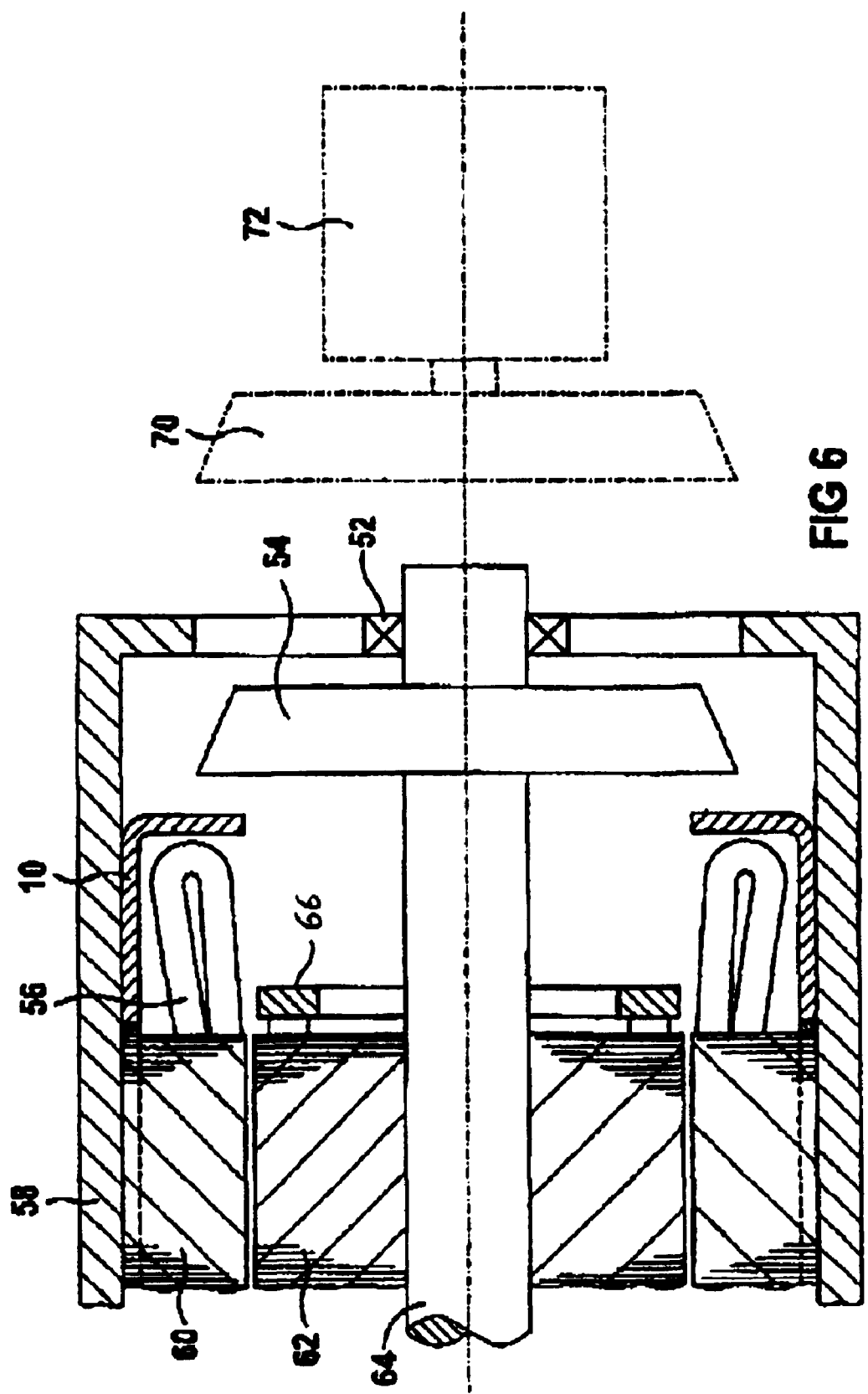

AIR-COOLED ELECTRIC ROTARY MACHINE

CROSS-REFERENCES TO RELATED APPLICATIONS

This application claims the priority of German Patent Application, Ser. No. 101 12 532.1, filed Mar. 15, 2001, the subject matter of which is incorporated herein by reference.

BACKGROUND OF THE INVENTION

The present invention relates, in general, to an air-cooled electric machine, and more particularly to an air-cooled electric rotary machine of a type having a stator with a laminated stator core having axial ends terminating in winding end portions, and a rotor spaced from the stator at formation of an air gap therebetween.

German Pat. No. 672,623 describes a cooling arrangement for closed electric machines, in particular three-phase motors. Disposed inside the closed machine are two fans for generating a flow of cooling air which is re-cooled by closed channels, or groups of channels, disposed on the outer surface area of the machine and circulated by a stream of coolant to define an outer coolant flow. At the axial ends, an inner coolant flow is routed by deflection walls through a looped path from one longitudinal channel or channel group in opposite direction to the following longitudinal channel or channel group.

This cooling arrangement suffers shortcomings because it requires the provision of two fans, one for each axial end of the stator core, in order to implement the looped deflection of the air stream. The use of two fans heightens the probability of a breakdown of the cooling action, and higher production costs are incurred compared to a system that would employ only one fan. Moreover, the presence of two separate cooling systems is also disadvantageous because heat has to be transferred from the inner cooling system to the outer cooling system. In accordance with the given thermal transmission coefficient, the cooling action is decreased by the cooling on the machine. The overall construction of the closed electric machine does not allow modular and variable constructions and thus is difficult to manufacture in various designs. This is true especially for types of machines that have different lengths, because separate constructions of cooling arrangements are required for each type, i.e. the construction of the machine requires a particular configuration of the cooling arrangement.

It would therefore be desirable and advantageous to provide an improved air-cooled electric rotary machine which obviates prior art shortcomings and which is so configured as to be applicable for different types of machines, in particular as far a machine length is concerned, while yet establishing a reliable and effective cooling action in a cost-efficient manner.

SUMMARY OF THE INVENTION

According to one aspect of the present invention, an air-cooled electric rotary machine, includes a stator including a stator having a stator core formed of laminations and having axial ends terminating in winding end portions, a rotor spaced from the stator at formation of an air gap therebetween, plural air channels, separated from one another and extending within and/or on the stator core, for allowing an air stream in complementary flow directions, a looped air stream conduction established by a directional deflection of the air stream at the winding end portions, and a single fan for cooling the stator by forcing the air stream to flow through the cooling channels and the looped air stream conduction.

The present invention resolves prior art problems by so structuring the electric rotary machine that only a single fan can be used for conduction of a sufficient air stream for cooling at least the laminated stator core. The air stream is conducted in separate cooling channels which can be formed in and/or on the stator core. Cooling channels provided in the stator core can be suitably formed, for example, by individually stamping the individual metal sheets of the stator core. The looped deflection of the air stream at the axial ends of the stator core allows an air stream in complementary flow directions. The looped air conduction is characterized by two factors. On the one hand, the air stream is guided about the winding end portions at the axial ends of the stator core, thereby following a circular, almost closed path and as a result assuming a looped configuration, and on the other hand the looped conduction of the air stream is established by separate cooling channels because of the necessity to reverse the flow direction by 180°.

When the stator core is cooled by only one air stream in only one direction, the temperature difference between air temperature and temperature of the stator core decreases as the air stream travels in the cooling channel. This cooling effect, which differs substantially and is dependent on the entry point of the cooling air, is counteracted when feeding air through separate cooling channels of the stator core. A temperature equalization is realized between the separate cooling channels in the stator at any location with respect to the longitudinal axis. When, for example, referring to the location on the stator core, which is characterized by the initial air entry into a cooling channel of the stator core, on the one hand, but also in a neighboring, separate cooling channel by the exit of the cooling air stream, on the other hand, a temperature equalization is realized there. The equalization is provided at this location—in this area—by air which has cooled a winding end portion, on the one hand, and has flowed already through two winding end portions and in addition has passed twice cooling channels in the stator core. As a consequence, a mean cooling action is established for each axial area of the stator core.

The fan for generating the air stream may be configured as an internal machine-own fan. This is advantageous in conjunction with complete systems. The machine-own fan may be positioned on one side of the axial ends of the stator core behind the end winding portions and constitutes the starting point for the air stream being forced through the machine. In the description, the term "machine-own fan" will denote merely the fact that the fan is part of or incorporated in the electric rotary machine. Hereby, it is, of course, conceivable to position the fan also on different locations of the machine. The air streams should then be so conducted as to establish a flow in a manner according to the invention.

In particular, when larger air-cooled electric rotary machines are involved or even groups of electric rotary machines, the air cooling of the electric rotary machine may also be implemented by an external fan, i.e. a fan that is positioned outside the electric rotary machine. The air stream produced by the external fan has at least one entry into the coolant system of the electric rotary machine. The utilization of an external fan has the advantage to allow the application of a single fan for different electric rotary machines or for different units to be cooled. An external fan, which is not part of the electric rotary machine, can also be more easily replaced. Two types of external fans can be referred to here by way of example. When the fan should not be positioned on the shaft of the electric rotary machine, it is possible to place the fan on the housing of the electric rotary machine. When ventilating several electric rotary machines with one fan, air channels are provided which distribute and feed the air to the individual electric rotary machines.

Regardless whether an internal fan or an external fan is involved, at least one exit zone is provided for the air stream. The looped conduction of the air stream at the end faces of the stator core is established by measures that effect a routing of at least a portion of the air stream radially through the winding end portions. Examples of such measures includes the provision of cap-like formed parts, air guides or air baffles, which may interact separately or in concert with a motor housing. Depending on the configuration of the winding end portions, the radial air conduction on the end faces of the stator core may be implemented by different configurations. Cast winding end portions are cooled by the cooling air stream along the outer surfaces of the cast product. When cooling channels are provided inside the cast product, a cooling action is implemented directly inside the winding end portions and heat is carried away. When the winding end portions are not cast products, at least parts of the cooling air stream can be conducted through the winding end portions so as to realize not only a heat dissipation via the outer surface of the winding end portions but also by the air stream routed through the winding end portions.

The air stream, or air streams, inside the machine can suitably be used so as to assist also in cooling a bearing unit provided for supporting the shaft of the electric rotary machine. Hereby, a bearing has cooling surfaces which project into the area of the cooling air stream. Through the assistance of air guides, the air stream or diversions of at least portions of the air stream can be routed to the bearings. The bearing or bearing end plate may have surface-enlarging structures for better cooling effect. In this way, bearings can be cooled by the air stream present in the machine.

As an alternative to the integration of cooling channels in the stator, the cooling effect may also be implemented in accordance with another embodiment of the present invention, through arrangement of a cooling jacket which has formed therein the cooling channels. There are many ways to integrate the cooling channels in the cooling jacket. Examples include casting or material-removing processes. The stator is surrounded at least partially by the cooling jacket, whereby the cooling channels are provided separate from one another for flow of air. The cooling jacket may be made of a same material as the formed parts at the axial ends of the stator core. The use of a cooling jacket is advantageous because there is no need or only a slight need for modifications of already existing stator concepts or stator designs, as the cooling jacket can already be best suited to the stator core at hand, in particular to the stator length. A standard machine, e.g. standard motor, can thus be retrofitted with the cooling system according to the present invention through execution of only few modifications.

According to another feature of the present invention, each axial end of the stator core has attached thereon at least one cap-like formed part for routing the air streams through the complementary air channels alternately and separately from one another in opposite radial directions. The air streams flowing in opposite radial directions are suitably routed within the caps through the winding end portions. It is therefore possible to conduct the air stream along the outside of one formed part in a direction radially away from the shaft whereas the air stream on the inside of the formed part, which at least partly surrounds the winding end portions, flows in the direction of the shaft center. As a consequence of the opposite axial directions, the looped conduction of the air streams is realized whereby the air streams are guided through or over the stator, and then deflected to flow along the end faces of the stator core in the 180° opposite direction.

When placed on both axial ends of the stator core, the cap-like formed parts are suitably identical. An identical design of the cap-like formed parts saves costs, when manufacturing the cap-like formed parts and the air-cooled electric rotary machine.

For economic and manufacturing reasons, it is advantageous to minimize the number of components for the electric rotary machine. Therefore, it may be desired to manufacture the cap-like formed part as well as the cooling jacket of single-piece configuration. Suitably, the cooling jacket and at least one cap-like formed part are configured of single-piece construction in which the stator and the rotor can then be simply inserted. In this way, the cooling jacket provides a closed, cylindrical part in which a major portion of the heat-generating sources of the air-cooled electric rotary machine are located.

Surface-enlarging elements may be placed in the cooling channels of the stator core for improving the heat transfer to the coolant. Thus, in air-cooled electric rotary machines with cooling channels, two different machine types can be realized with different cooling action. The surface-enlarging elements are made of heat-conducting material to improve the cooling effect of the system, when originally integrated or even subsequently added.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is an illustration of a cooling jacket for use in another embodiment of a stator according to the present invention, depicting on the right half a partially sectional view of a cooling jacket, taken along the line II—II in FIG. 3, and on the left half an end view of the cooling jacket;

FIG. 3 is a longitudinal section of the cooling jacket, taken along the line III—III in FIG. 2;

FIG. 6 is a principal, sectional view of a rotary electric machine, having incorporated the subject matter of the present invention.

DETAILED DESCRIPTION OF PREFERRED EMBODIMENTS

Figure 1:
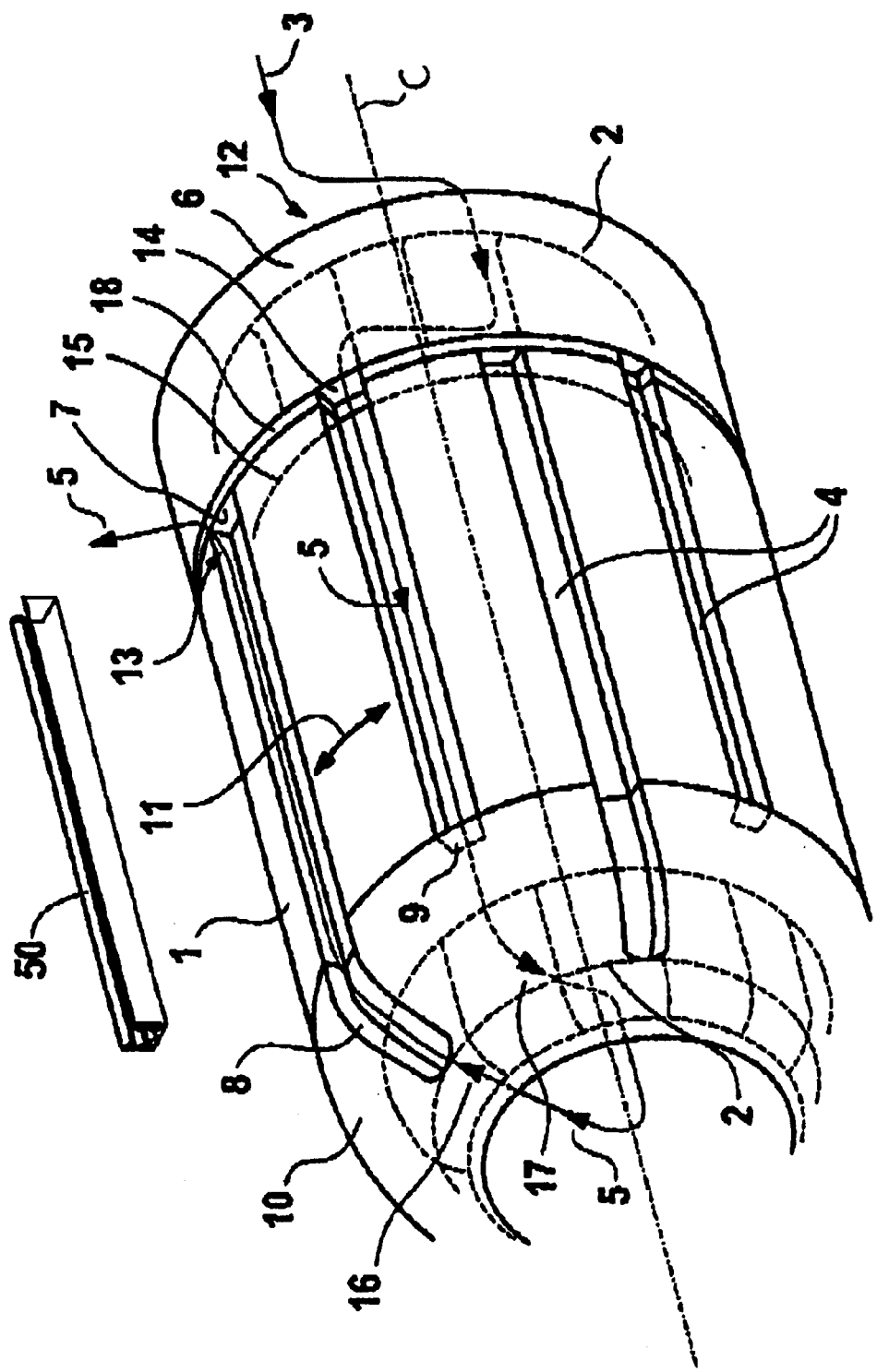
FIG. 1 is a schematic, perspective illustration of one embodiment of a stator with laminated stator core in accordance with the present invention for use in an electric rotary machine.

Throughout all the Figures, same or corresponding elements are generally indicated by same reference numerals.

Turning now to the drawing, and in particular to FIG. 1, there is shown a schematic, perspective illustration of a stator according to the present invention, generally designated by reference numeral 1 and forming part of an air-cooled electric rotary machine which is shown in greater detail in FIG. 6 and has a housing 58 for accommodating the stator 1 and a rotor at formation of an air gap therebetween. The stator 1 has a stator core 60, formed of a plurality of stacked laminations and provided with a winding 56. On opposite axial ends thereof, the stator 1 includes winding end portions 2 to support the stator core 60 therebetween. The rotor has a rotor core 62 which is formed of a plurality of stacked laminations. Reference numeral 66 designates a short-circuit ring at an end face of the rotor core 62. The rotor core 62 is mounted onto a shaft 64 which is oriented in a center axis C of the electric rotary machine and rotatably supported through bearings 52.

As shown in FIG. 1, the stator 1 is formed with plural cooling channels 4 which are separate from one another for circulation of distinct flows of coolant 5. An example of a coolant 5 includes air, which flows through the stator 1 along a path indicated by reference numeral 3. Attached to the right-hand axial end of the stator 1 is a cap-like formed part 6 which surrounds the right-hand winding end portions 2, whereas the left-hand axial end of the stator 1 has attached thereon a cap-like formed part 10 (see also FIG. 6). In the description, the term "right-hand" will denote a direction to those portions of the stator 1 of the electric rotary machine which appear on the right side of FIG. 1, while the term "left-hand" will denote the opposite location.

At the interface with the axial end of the stator 1, the formed part 6 includes an end piece 18 which is formed with openings 14 and end plates 7 which are so positioned that a random number of the cooling channels 4 is fluidly connected to the inside of the formed part 6 while others are cut from the inside of the formed part 6. As indicated by path 3, cooling air enters the electric rotary machine at the cap-like formed part 6 shown at the right-hand side of FIG. 1 and is then guided to flow in axial direction of the stator 1 to the other side. More specifically, after entry on the right-hand side, the cooling air is deflected by the formed part 6 in radial direction to the outside to at least partially flow through the winding end portions 2 on the right-hand side. After cooling the right-hand winding end portions 2, the flow of cooling air is routed by the right-hand formed part 6 into the cooling channels 4. Entry into the cooling channels 4 is, however, only possible at those locations where the end piece 18 of the formed part 6 has the openings 14 in alignment with the cooling channels 4. Upon entry into the respective cooling channels 4, cooling air streams flow in axial direction along the stator 1 until reaching the other end where the flow of cooling air enters through an inner guide 9 into the left-hand cap-like formed part 10 which is so configured that the cooling air flows outwards in a radial direction. The cooling air stream flows hereby at least partially through the winding end portions 2 for cooling them as a result of the flow direction of the cooling air in parallel relationship to the center axis C. After passage of the winding end portions 2, the stream of cooling air is deflected radially upwards at the end face 16 of the cap-like formed part 10 in a looped manner to return in a direction of the right-hand formed part 6 via an outer guide 8 of the formed part 10 and a respective one of the cooling channels 4. After flowing through the cooling channel 4, the cooling air is deflected by the end plate 7 of the end piece 18 through an exit zone as indicated by reference numeral 13. Of course, additional elements may be used here for assisting the discharge of the cooling air through the exit zone 13.

As shown in particular in FIG. 6, a single fan 54 can be used here for forcing the coolant 5 (cooling air) to flow through the cooling channels 4 and to flow in the looped coolant conduction in the area of the winding end portions 2. The fan 54 is here an integral part of the electric rotary machine. As an alternative, persons skilled in the art will understand that the internal fan 54 may be substituted by an external fan, as indicated by dashdot line in FIG. 6 and designated by reference numeral 70, which is operated by a separate motor 72.

As further shown in FIG. 1, surface-enlarging elements 50 may also be placed in the cooling channels 4 of the stator core 60 for improving the heat transfer to the coolant 5.

Referring now to FIG. 2, there is shown a sectional view of a cooling jacket, generally designated by reference numeral 29, for use with another embodiment of a stator according to the present invention for an air-cooled electric rotary machine. In this embodiment, the cooling jacket 29 represents a separate structural member and has a main body 21. The left-hand side of FIG. 2 shows the front plan view of the main body 21 whereas the right-hand side of FIG. 2 is a sectional view to show cooling channels 19, 20 in the main body 21. Thus, the cooling jacket 29 is used here for a stator, not shown here, which is, unlike the stator 1 of FIG. 1, devoid of cooling channels and surrounded by the cooling jacket 29. The cooling channels 19, 20 differ in the flow direction of the cooling air, i.e. the flow of cooling air in the cooling channels 19 is in one direction while the flow of cooling air in the cooling channels 20 is in the opposite direction.

FIG. 3 shows the cooling jacket 29, taken along the line III—III in FIG. 2, and it can be seen that the cooling jacket 29 has ventilation apertures 23 to allow cooling air to flow in radial direction and through the winding end portion 2 into the cooling channel specific for the winding end portion and across the stator core, and to conduct the flow of cooling air from there again via the winding end portion ventilating apertures 23 in radial direction with respect to the center axis C to the opposite other winding end portion 2. After passing through the other winding end portion 2, the flow of cooling air is deflected in a loop-like manner and guided via stator opening 24 for return air into a return passage 19. After reaching the end of the return passage 19, the heated air stream is guided out of the system.

FIG. 3 further depicts the provision of air stream partitions 28 to separate the air streams which still have to flow through the respective winding end portion 2 from those air streams that have already passed through the respective winding end portion 2.

Figure 5:
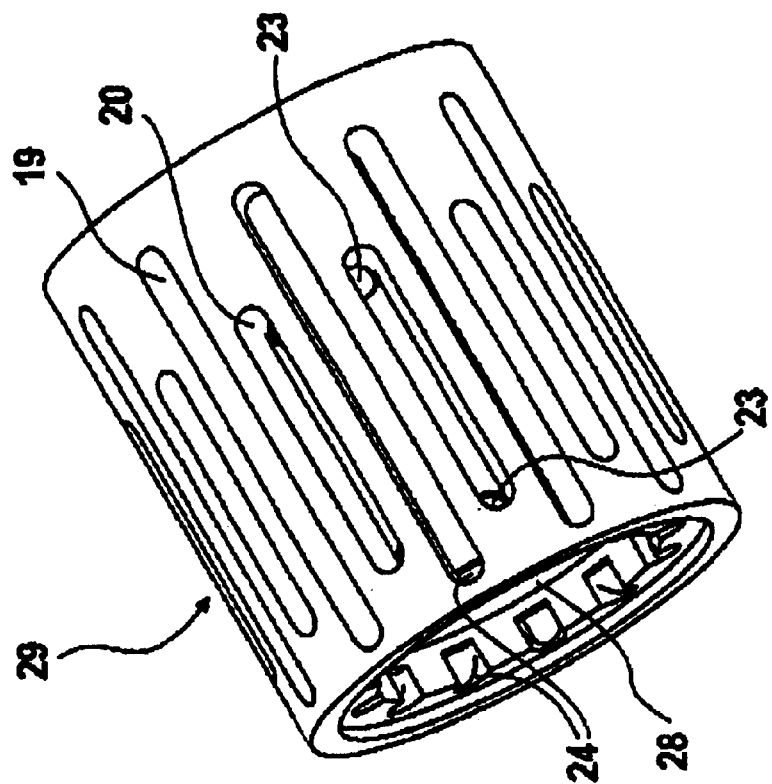
FIG. 5 is a perspective illustration of the cooling jacket of FIG. 4.
Figure 4:
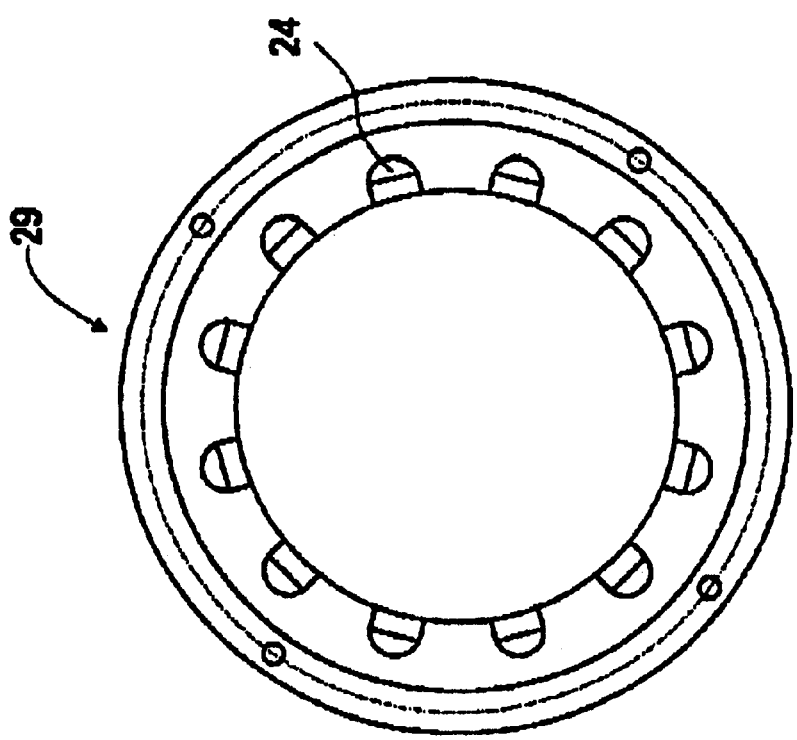
FIG. 4 is an end plan view of the cooling jacket of FIG. 2.

Turning now to FIGS. 4 and 5, there are shown an end plan view and a perspective view of the cooling jacket 29. In particular FIG. 5 shows the offset relationship of the cooling channels 19 with respect to the cooling channels 20. Of course, the cooling channels 19, 20 may be configured of same length. However, care should then be taken that the apertures 23 for incoming and outgoing cooling air are arranged in offset disposition in the cooling channels 19, 20.

At operation, cooling air entering the stator core, for example, from the right-hand side, passes through the winding end portion 2 at this end and is then radially directed through the apertures 23 into the cooling channels 20. After flowing in axial direction through the channels 20, the cooling air is guided in radial direction through the apertures 23 on this end of the channels 20 for passage through the winding end portion 2 on the left-hand side of the stator core. Subsequently, the cooling air stream is guided through the openings 24 into the channels 19 for returning to the other side again and ultimately exits from the system, once the end of channels 20 has been reached.

While the invention has been illustrated and described as embodied in an air-cooled electric rotary machine, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. An air-cooled electric rotary machine, comprising:
    a stator including a stator core formed of laminations and having axial ends terminating in winding end portions, said stator having an outer surface area formed with plural cooling channels separated from one another and extending between the axial ends for conducting the air stream in the axial direction;
    a rotor spaced from the stator at formation of an air gap therebetween;
    a looped air stream conduction established by a directional deflection of the air stream at the winding end portions; and
    a single fan for cooling the stator by generating the air stream to flow through the plural cooling channels and the looped air stream conduction in different flow directions.

2. The rotary machine of claim 1, wherein the fan is an integral part of the machine.

3. The rotary machine of claim 1, wherein the fan is an external fan.

4. The rotary machine of claim 1, and further comprising flow-directing means for guiding at least a portion of the air stream in a radial direction through the winding end portions.

5. The rotary machine of claim 4, wherein the rotor is mounted on a shaft, and further comprising a bearing for rotatably supporting the shaft, said flow-directing means being so configured as to route the air stream to the bearing for cooling thereof.

6. The rotary machine of claim 4, wherein the flow-directing means includes two cap-like formed parts, one formed part attached to one axial end of the stator core and one formed part attached to the other axial end of the stator core, for routing air streams separately from one another in opposite radial directions.

7. The rotary machine of claim 6, wherein the two cap-like formed parts are identical.

8. The rotary machine of claim 6, wherein the formed parts are each of single-piece configuration.

9. The rotary machine of claim 6, and further comprising a cooling jacket for at least partially surrounding the stator, wherein the cooling jacket has formed therein separate cooling channels, wherein the cooling jacket and at least one of the cap-like formed parts form together a single-piece structure.

10. The rotary machine of claim 1, end further comprising surface-enlarging elements configured for placement in the cooling channels.

11. The rotary machine of claim 1, wherein the cooling channels are formed in the stator core by a manufacturing process so as to incorporate a surface-enlarging structure.

12. The rotary machine of claim 11, wherein the manufacturing process includes one of stamping and casting.

13. The rotary machine of claim 1, wherein the cooling channels include surface-enlarging elements.

14. An air-cooled electric rotary machine comprising:
    a stator defining an axis and having axial ends, wherein the stator has an outer surface area formed with plural air channels separated from one another and extending between the axial ends for conducting the air stream in the axial direction;
    a rotor encircled by the stator, said rotor and said stator defining an air gap therebetween;
    a single fan for generating an air stream; and
    guiding means for directing the air stream so as to flow in a predetermined path at one axial end and in a looped path at the other axial end while being able to flow in opposite directions between the axial ends of the stator.

15. The rotary machine of claim 14, wherein the fan is one of internal fan and external fan.

16. The rotary machine of claim 14, wherein the guiding means includes two cap-like formed parts, one formed part attached to one axial end of the stator core for routing an air stream in one radial direction and one formed part attached to the other axial end of the stator core for routing an air stream in an opposite radial directions.

* * * * *